United States Patent
Sugita et al.

(10) Patent No.: US 9,329,760 B2
(45) Date of Patent: May 3, 2016

(54) INFORMATION PROCESSING APPARATUS, CONTROL METHOD THEREOF, AND PROGRAM

(71) Applicant: CANON KABUSHIKI KAISHA, Tokyo (JP)

(72) Inventors: Norio Sugita, Yokohama (JP); Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 13/744,741

(22) Filed: Jan. 18, 2013

(65) Prior Publication Data

US 2013/0191782 A1 Jul. 25, 2013

(30) Foreign Application Priority Data

Jan. 20, 2012 (JP) ................................. 2012-010266

(51) Int. Cl.
*G06F 3/0484* (2013.01)
*G06F 3/0482* (2013.01)

(52) U.S. Cl.
CPC .......... *G06F 3/04842* (2013.01); *G06F 3/0482* (2013.01)

(58) Field of Classification Search
None
See application file for complete search history.

(56) References Cited

U.S. PATENT DOCUMENTS

2011/0122153 A1* 5/2011 Okamura et al. ............. 345/629
2012/0162249 A1* 6/2012 Tsuda et al. .................. 345/629

FOREIGN PATENT DOCUMENTS

JP 2010026975 A 2/2010
JP 2011-28560 A 2/2011

* cited by examiner

*Primary Examiner* — Stella E Higgs
(74) *Attorney, Agent, or Firm* — Canon USA Inc. IP Division

(57) ABSTRACT

An information processing apparatus capable of displaying information about a plurality of content data pieces recorded in a recording medium by a display unit includes a first display control unit configured to control the display unit such that information about content data is displayed in an arrangement based on attribute information of the content data, and a second display control unit configured to control the display unit such that information about content data is displayed in an arrangement based on other attribute information, wherein the second display control unit controls the display unit to display information indicating existence of the content data of which information is displayed by the first display control unit and information indicating existence of content data of which information is not displayed by the first control unit in a distinguishable manner.

12 Claims, 5 Drawing Sheets

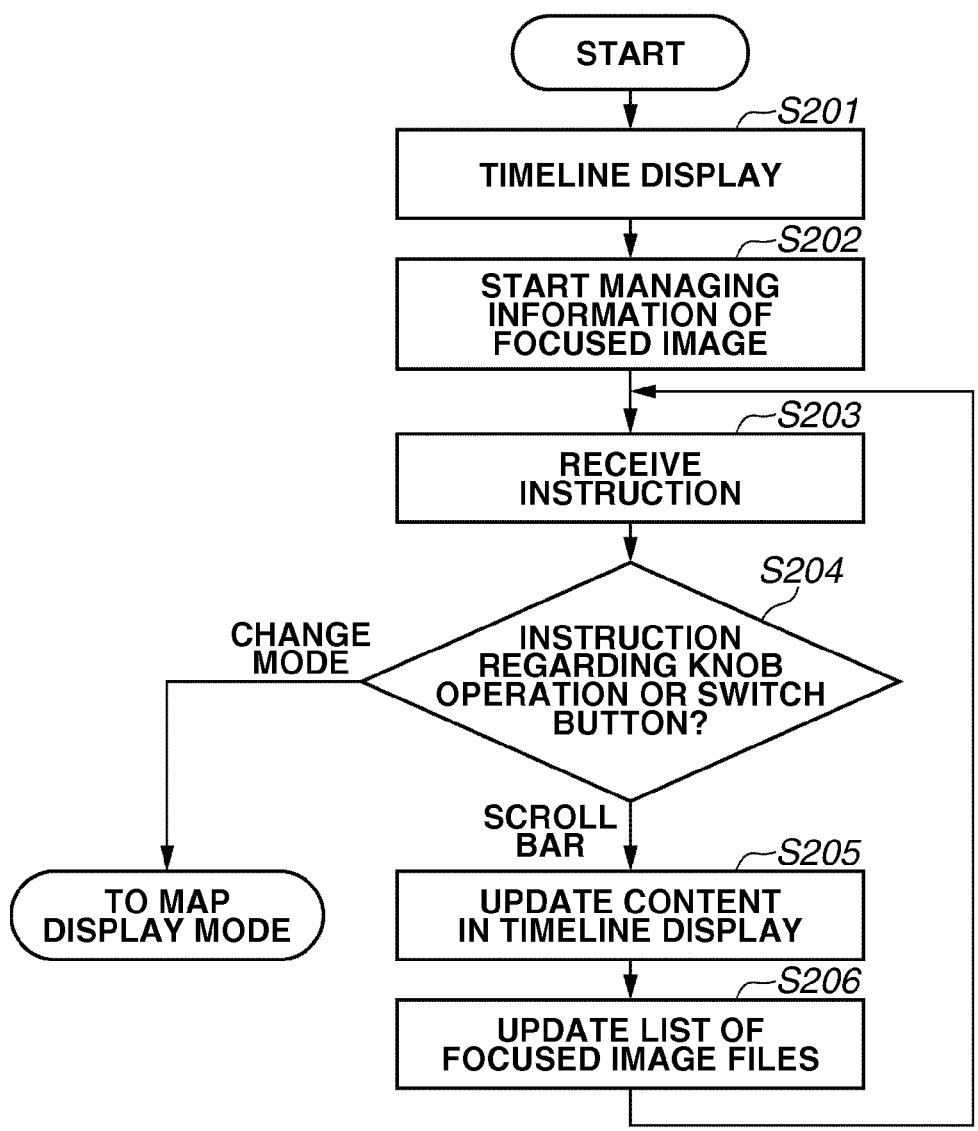

INFORMATION PROCESSING APPARATUS, CONTROL METHOD THEREOF, AND PROGRAM

BACKGROUND OF THE INVENTION

1. Field of the Invention

The present disclosure generally relates to information processing and, more particularly, to an information processing apparatus for displaying content data according to its attribute information on a screen.

2. Description of the Related Art

Conventionally, there are information processing apparatuses that display a list of a plurality of images on a display area of a screen. In addition, according to widespread use of the global positioning system (GPS) in recent years, an imaging position at which an image is captured can be displayed on a map. For example, some information processing apparatuses may switch a display mode between a list display mode for displaying a list of images and a map display mode for displaying the image on an appropriate position on a map based on the imaging position thereof.

However, according to the conventional technique, which image a user focuses on when the mode is changed is not considered. In other words, the image is displayed regardless of whether it is the image the user focuses on or not. Thus, according to the conventional technique, if the mode is changed to the map display mode, the focused image displayed in the list display mode is mixed among other images, and the user may lose sight of the focused image.

SUMMARY OF THE INVENTION

According to an aspect of the present disclosure, an information processing apparatus capable of displaying information about a plurality of content data pieces recorded in a recording medium in a display area of a display unit includes a first selection unit configured to select content data from the plurality of content data pieces based on attribute information of the content data, a first display control unit configured to control the display unit such that information about the content data selected by the first selection unit is displayed in the display area in an arrangement based on the attribute information of the content data, a second selection unit configured to select content data from the plurality of content data pieces based on other attribute information different from the attribute information used for the first display control unit, a second display control unit configured to control the display unit such that information about the content data selected by the second selection unit is displayed in the display area in an arrangement based on the other attribute information, and a receiving unit configured to receive an instruction to control display in the display area by the second display control unit while a result of the control by the first display control unit is displayed in the display area, wherein, if the instruction is received by the receiving unit, the second display control unit controls the display unit to display information indicating existence of the content data of which information is displayed by the first display control unit and information indicating existence of content data of which information is not displayed by the first control unit in a distinguishable manner.

According to an aspect of the present disclosure, when a display mode of contents is changed, a possibility of losing sight of the contents that a user focuses on before the change of the display mode can be reduced.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 2 is a flowchart illustrating an operation of the information processing apparatus in a timeline display mode according to the first exemplary embodiment.

DESCRIPTION OF THE EMBODIMENTS

Various exemplary embodiments, features, and aspects of the disclosure will be described in detail below with reference to the drawings.

Figure 1:
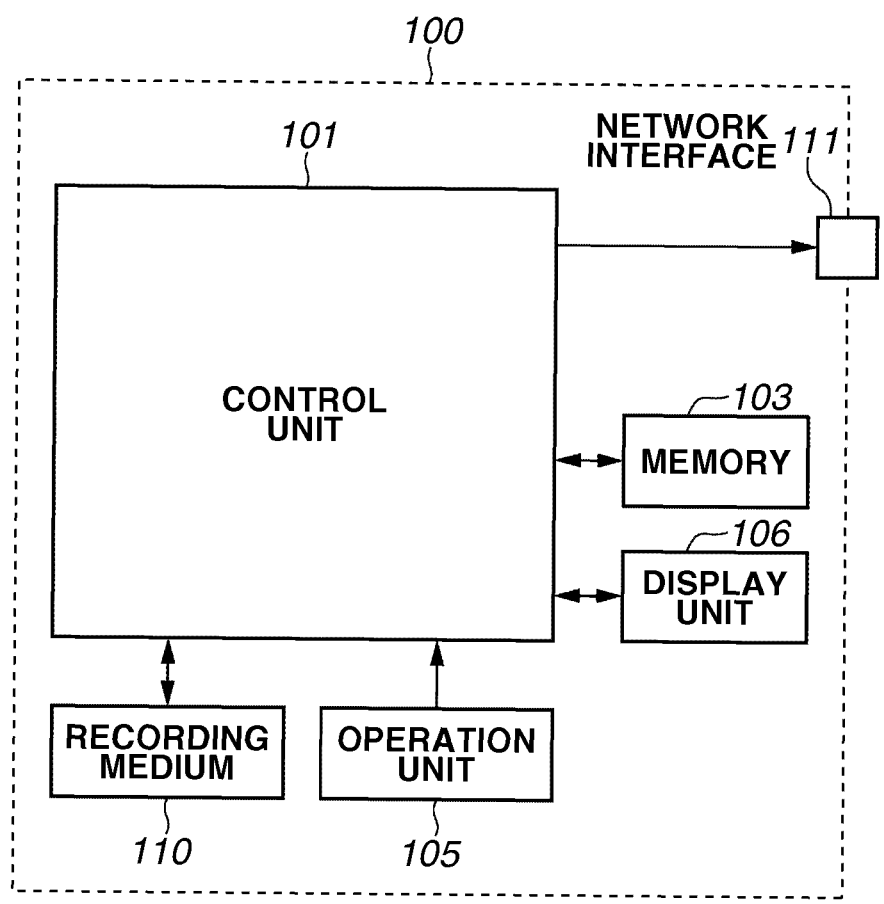
FIG. 1 is a block diagram of an information processing apparatus according to a first exemplary embodiment of the present disclosure.

FIG. 1 illustrates a configuration of an information processing apparatus according to a first exemplary embodiment. The information processing apparatus according to the present exemplary embodiment may include, for example, a personal computer, a cellular phone, or what is referred to as a tablet device.

A control unit 101 controls each unit of an information processing apparatus 100 according to an input signal and a program described below. In place of the control unit 101, a plurality of hardware units can control the entire apparatus by sharing the processing.

A memory 103 is used as a buffer memory that temporarily stores data, an image display memory of a display unit 106, a working area of the control unit 101, and the like.

An operation unit 105 is used for receiving an instruction from a user to the information processing apparatus 100. The operation unit 105 may include, for example, a keyboard and a pointing device. A mouse, a touch pad, or a touch panel can be used as the pointing device.

The display unit 106 displays data stored in the information processing apparatus 100 or data which is supplied thereto. For example, the display unit 106 displays a display area on a window of an information management application program. The information management application program will be described below. The information processing apparatus 100 does not necessarily include the display unit 106. However, the information processing apparatus 100 needs to be able to be connected to the display unit 106 and at least includes a display control function for controlling the display of the display unit 106.

A recording medium 110 stores various programs executed by the control unit 101 and information pieces, such as an operating system (OS), content information such as image files and audio files, an information management application program, and map information. According to the present exemplary embodiment, image files are in an exchangeable image file format (EXIF) Joint Photographic Experts Group (JPEG) format. If an image is in the EXIF-JPEG format, a thumbnail and attribute information are recorded at the header of the file. The recording medium 110 may be mountable/detachable from the information processing apparatus 100 or may be integrated in the information processing apparatus 100. In other words, the information processing apparatus 100 can at least include means for accessing the recording medium 110.

A network interface 111 is used, for example, for connecting the information processing apparatus 100 to a network line such as the Internet. According to the present exemplary embodiment, it is described that information about an image file or a map is stored in the recording medium 110, however, the present invention can also be realized when such information is obtained from an external apparatus via the network interface 111. The information processing apparatus according to the present exemplary embodiment may be realized by a single information processing apparatus or a plurality of information processing apparatuses in which functions are shared thereamong as necessary. If the information processing apparatus according to the present exemplary embodiment includes a plurality of information processing apparatuses, the apparatuses are communicably connected each other, for example, by a local area network (LAN).

Next, the above-described information management application program (i.e., information management application) will be described. The information management application according to the present exemplary embodiment includes has a timeline display mode and a map display mode. The timeline display mode is used for arranging and displaying thumbnails of image files recorded in the recording medium 110 in the order of the imaging date and time. The map display mode is used for displaying imaging positions of the image files recorded in the recording medium 110 on a map.

According to the present exemplary embodiment, the position information and the date and time information are recorded in the header area of each image file. The position information and the date and time information respectively provide the imaging position and the imaging date of the image file. The control unit 101 that executes the information management application appropriately displays the thumbnails of the image files by referencing such position information and date and time information.

Figure 3A:
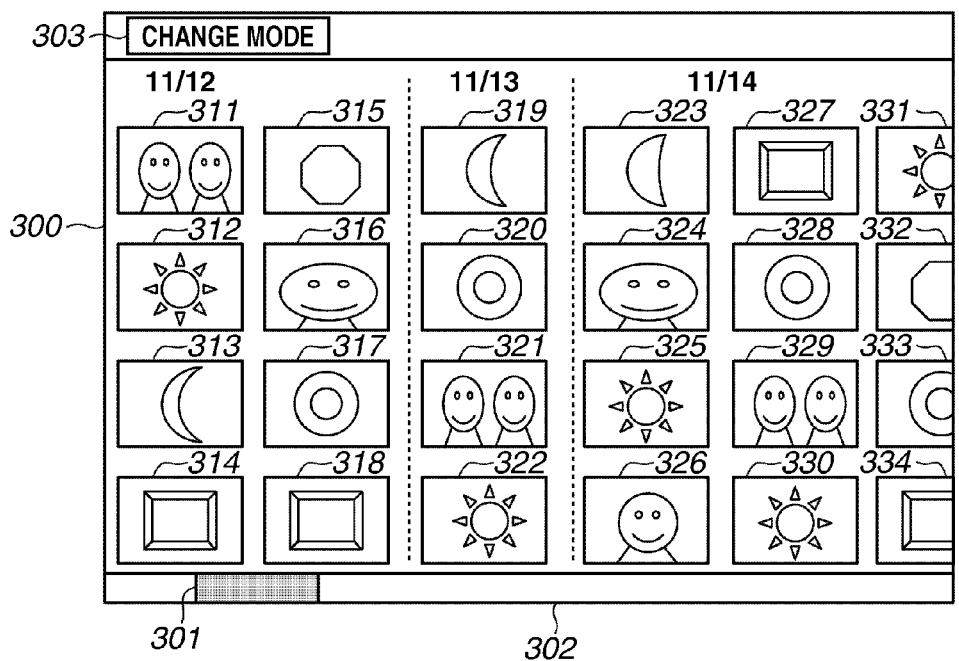
FIGS. 3A and 3B are examples of a display screen in the timeline display mode according to the first exemplary embodiment.
Figure 3B:
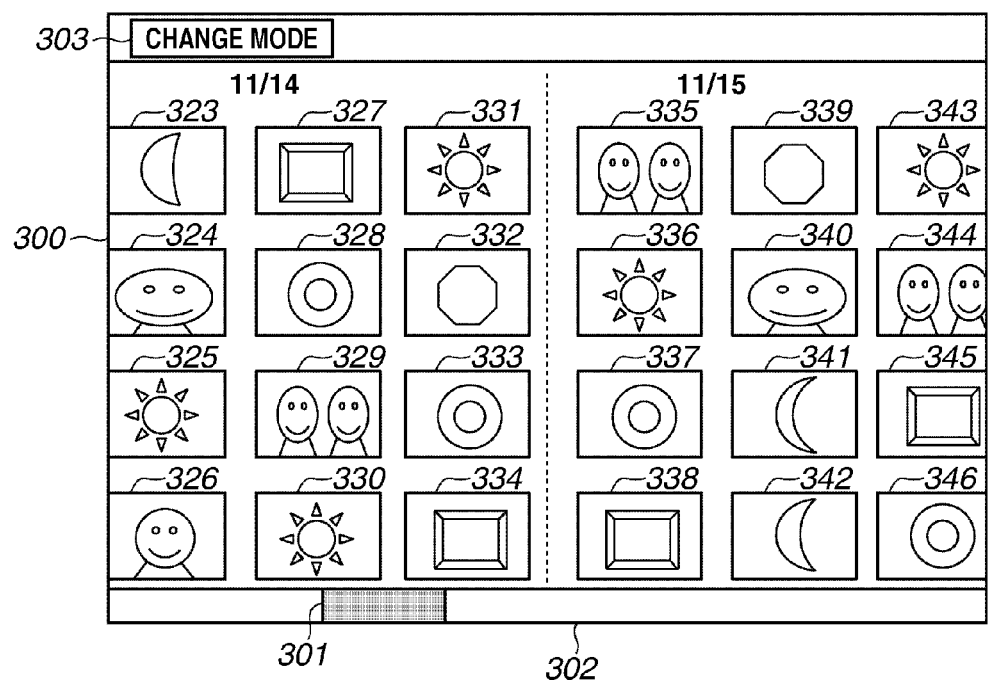
Figure 5:
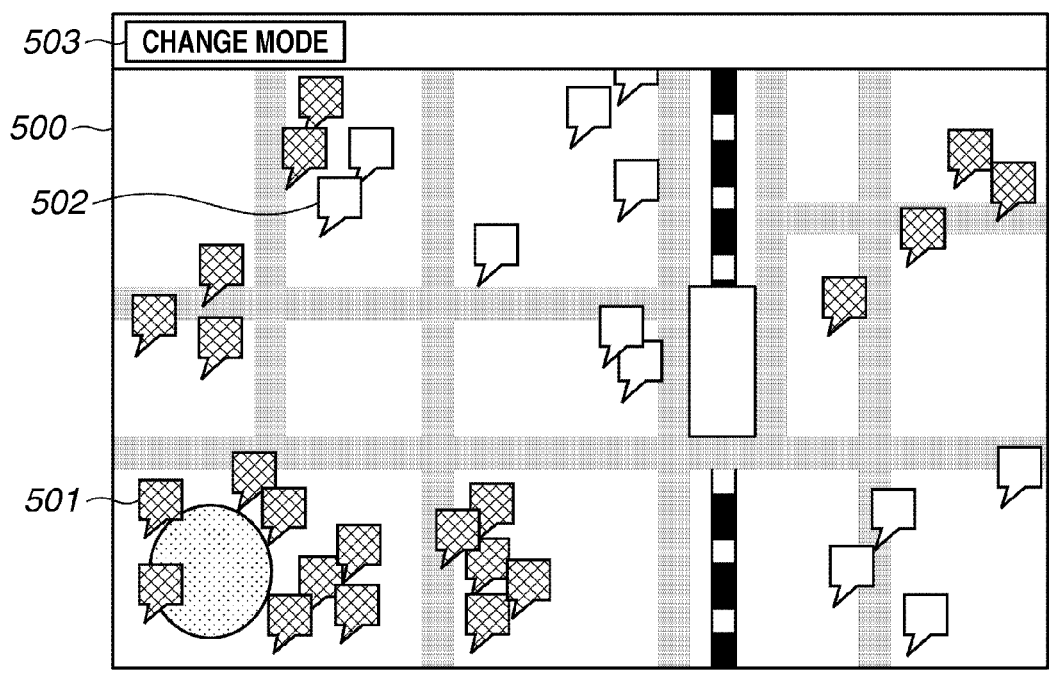
FIG. 5 is an example of a display screen in the map display mode according to the first exemplary embodiment.

Examples of interfaces in each mode are illustrated in FIGS. 3A, 3B, and 5. FIGS. 3A and 3B illustrate examples of the interface in the timeline display mode. FIG. 5 illustrates an example of the interface in the map display mode. These modes can be switched according to a user instruction.

The operations of the information processing apparatus 100 in each mode will be described below.

First, the operation of the information processing apparatus in the timeline display mode will be described.

FIG. 2 is a flowchart illustrating the operation of the information processing apparatus in the timeline display mode. The processing in this flowchart is started when the control unit 101 executes the information management application and is realized when the control unit 101 controls each unit of the information processing apparatus 100 according to the OS and the information management application. Wherein, for example, the control unit 101 performs as a first selection unit and performs a first display control unit.

In step S201, the control unit 101 selects the image files recorded in the recording medium 110 in the display area of the window in the date and time order that the image files have been created, and displays the thumbnails of the image files. For example, the control unit 101 displays the thumbnails as illustrated in the screen in FIG. 3A. FIG. 3A illustrates an example of the screen displayed according to the processing in step S201. In order to display a screen such as the one illustrated in FIG. 3A, in step 201, the control unit 101 sorts identifications (IDs) of the image files recorded in the recording medium 110 by the order of the imaging date and time. According to the present exemplary embodiment, a unique ID is assigned to each of the image files recorded in the recording medium 110. The control unit 101 manages the image files based on such an ID.

There is a certain limit regarding the number of thumbnails that can be displayed in a display area 300. Thus, the number of thumbnails that can be displayed is determined based on a display size of a thumbnail and a size of the display area. If the sorting of the IDs and the determination of the number of thumbnails to be displayed are completed, a number of IDs corresponding to the number of thumbnails that can be displayed are acquired from the sorted IDs based on the order corresponding to a position of a knob 301 as a reference.

Then, thumbnails are read out from the headers of the image files that correspond to such IDs. The thumbnails which have been read out are sequentially displayed from an upper left portion of the display area. As a result, a screen, as the one illustrated in FIG. 3A, is displayed.

According to the above-described processing, the thumbnails of the image files are displayed in the display area 300 in FIG. 3A from the left side in ascending order (chronological order) based on the imaging date and time. In other words, the thumbnails of the image files displayed on the left side are those of the old imaging date and time and the thumbnails of the image files on the right side are those of the recent imaging date and time. Further, according to the example illustrated in FIG. 3A, the thumbnails are displayed by the imaging date. If the thumbnails of the image files created in one day do not fit in one vertical row, another row is added. In this manner, the width corresponding to one day is determined according to the number of image files which have been created that day.

Further, a scroll bar 302 including the knob 301 is displayed on the screen. The position of the knob 301 with respect to the scroll bar 302 indicates the order of the thumbnails displayed in the display area. For example, when there are 100 image files and the number of thumbnails to be displayed in the display area is 20, and further, if the knob 301 is at the left end of the scroll bar 302, the thumbnails of the image files based on the first to the 20th IDs are displayed in the display area. As described above, since the IDs are sorted in the imaging date and time, the thumbnails are arranged and displayed in the date and time order. In the following description, a range of the IDs of the image files that correspond to the thumbnails displayed in the display area of the sorted IDs is referred to as an image display range.

By the user operating the knob 301 via the operation unit 105, the image display range can be changed according to the order of the sorted IDs. In other words, the thumbnails displayed in the display area can be changed in the order of the sorted IDs according to the position of the knob 301. For example, if the user moves the knob 301 from the left end to the right, the thumbnails of the image files which have been created recently will be displayed in place of the thumbnails of the image files of the older date and time. In the above-described example, for example, the thumbnails of the image files based on the 21st to the 30th IDs will be displayed in place of the thumbnails of the image files based on the first to the 10th IDs. In this manner, a part of the list of thumbnails of the image files arranged in the imaging date and time order is displayed in the display area 300 of the window, and an interface can be provided which changes the display position of the part of the list of thumbnails by the user operating the knob 301.

A switch button 303 used for changing the mode to the map display mode is displayed in the screen in FIG. 3A. When the user selects the switch button 303 via the operation unit 105, the user can input an instruction to shift the timeline display mode to the map display mode. The size of the display area may be changed according to a change in a window size of the information management application. Further, the display size of the thumbnails can be changed according to the operation of the user. The processing in step 201 is executed in parallel with the processing in steps S202 and S203 described below.

In step S202, which is performed in parallel with the processing in step S201, the control unit 101 makes a list of IDs of each image file corresponding to the thumbnails currently displayed in the display area 300 as a list of IDs of the image files the user focuses on. Then, the control unit 101 stores the list. According to the example in FIG. 3A, from among the image files which have been created from November 12 to 14, IDs of the image files corresponding to thumbnails 311 to 334 displayed in the display area 300 are stored in the list of the focused image files. In this manner, according to the present exemplary embodiment, the image files corresponding to the thumbnails which are currently displayed are treated as the image files the user focuses on. The stored IDs are used in the map display mode. How the stored IDs are used will be described below. In addition, the list of the focused image files is updated in real time when the user moves the knob 301 and the thumbnails displayed in the display area 300 are changed.

In step S203, the control unit 101 receives an instruction from the user. The processing in this step is executed in parallel with the processing in steps S201 and S202.

In step S204, the control unit 101 determines whether an operation of the knob 301 or an instruction regarding the selection of the switch button 303 is received. If it is determined that the operation of the knob 301 is received (SCROLL BAR in step S204), the processing proceeds to step S205.

In step S205, the control unit 101 updates the content displayed in the display area 300 according to the user's operation of the knob 301. More specifically, the thumbnails are read out according to the position where the knob 301 is moved and displayed in the display area 300. This processing will be described with reference to FIG. 3B.

FIG. 3B illustrates an example of the screen in a case where the knob 301 is moved to the right side from the state illustrated in FIG. 3A so that the thumbnails of newer image files are displayed. In this case, the thumbnails 311 to 322 of the image files which have been created from November 12 to November 13 and displayed in FIG. 3A are scrolled out and not displayed on the screen. On the other hand, thumbnails 335 to 346 of the image files which are among the image files created in November 15 are read out from the recording medium 110, and scrolled in and displayed on the screen. The thumbnails 335 to 346 are those newly read out from the recording medium 110 according to the position of the knob 301.

According to the example in FIG. 3B, since the number of thumbnails that can be displayed in the vertical direction in the display area 300 is four, the thumbnails are read out in units of four in the order of the sorted IDs. The thumbnails which have already been displayed in FIG. 3A are not read out from the recording medium 110 and only moved to the right side. By repeating this operation, the user can display a desired image file from the image files recorded in the recording medium 110.

In step S206, according to the processing similar to that in step S202, the control unit 101 updates the list of the focused image files which are stored. According to the update of the display, the IDs of the image files of the thumbnails 311 to 322 stored in step S202 are deleted from the list, and the IDs of the image files of the thumbnails 335 to 346 which are newly displayed are added to the list. In other words, the image files of the thumbnails 311 to 322 are determined that they are no longer the image files the user focuses on. Then, the image files of the thumbnails 335 to 346 are regarded as the focused image files together with the image files of the thumbnails 323 to 334.

According to the example in FIG. 3B, not all of the thumbnails of the image files created on November 15 are displayed. Among the image files created on November 15, the image files that correspond to the thumbnails which are not displayed on the screen are not added to the list, and thus are not treated as the image files that the user focuses on. Further, according to the present exemplary embodiment, even if the entire thumbnail is not displayed (e.g., the thumbnails at the left end or the right end of the screen in FIGS. 3A and 3B), the image file of such a thumbnail is added to the list and treated as an image the user focuses on.

When the processing in step S206 is completed, the processing returns to step S203, and the control unit 101 waits until it receives the next instruction.

On the other hand, in step S204, if the control unit 101 determines that an instruction regarding the selection of the switch button 303 is received (CHANGE MODE in step S204), the mode is changed to the map display mode.

The operation of the information processing apparatus in the timeline display mode is as described above. According to the timeline display mode of the present exemplary embodiment, the ID of the image file that the user focuses on is stored. Next, the operation of the information processing apparatus in the map display mode using the ID of the focused image file will be described.

Figure 4:
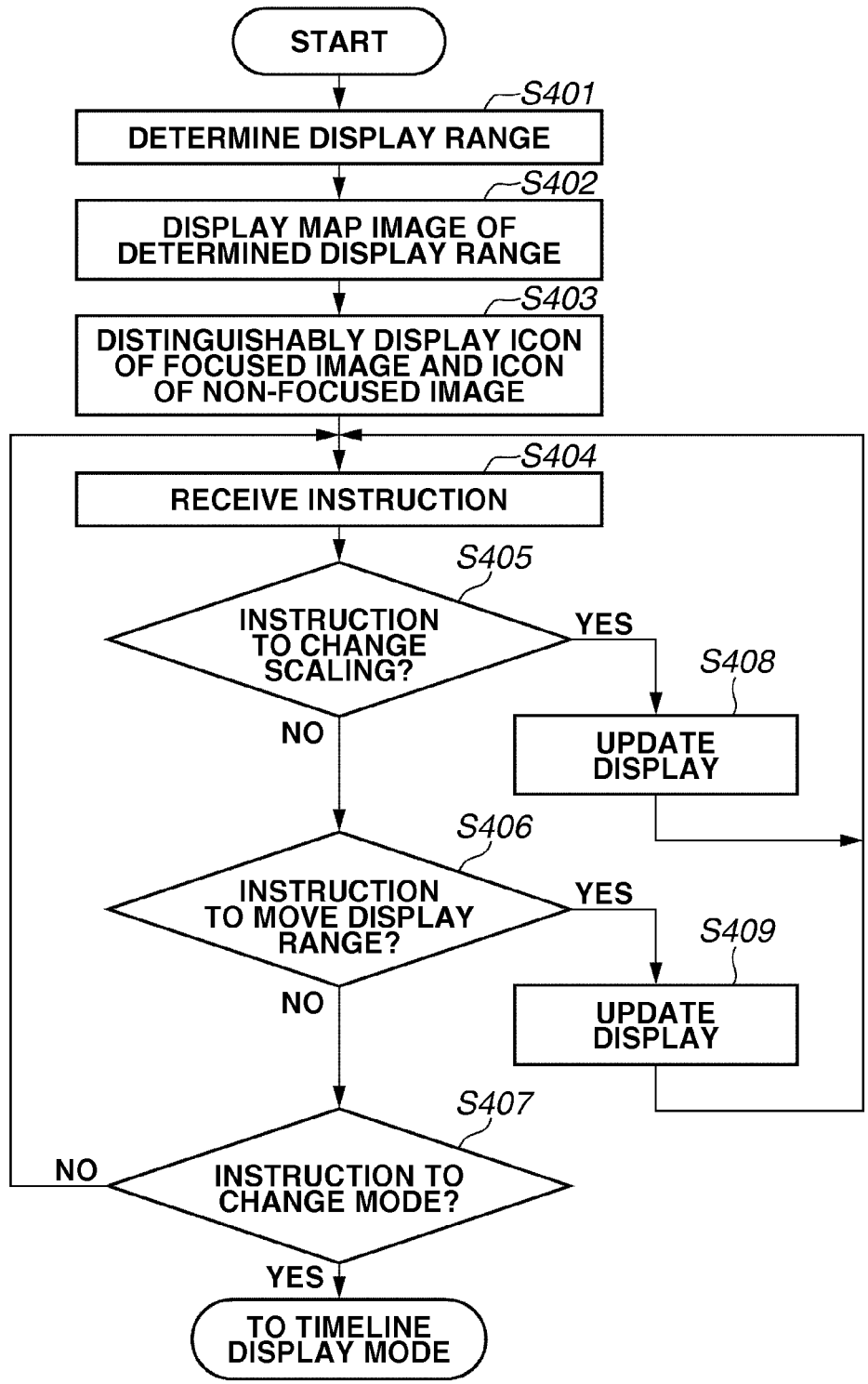
FIG. 4 is a flowchart illustrating an operation of the information processing apparatus in a map display mode according to the first exemplary embodiment.

FIG. 4 is a flowchart illustrating the operation of the information processing apparatus 100 in the map display mode. The processing in this flowchart is started, for example, when an instruction to shift the mode to the map display mode is received in step S204 in FIG. 2, and realized when the control unit 101 controls each unit of the information processing apparatus 100 according to the OS and the information management application.

In step S401, the control unit 101 reads out, from the recording medium 110, a map image of an appropriate display range and scale in which the imaging position of the image file that the user focuses on in the timeline display mode is fitted into the display area of the map and displays the map in the display area of the window. The image file the user focuses on can be searched for by referencing the ID in the list of the focused image files stored in the timeline display mode.

If the mode is shifted from the state as illustrated in FIG. 3B to the map display mode, the display range and the scale are determined based on the position information of the image files of the thumbnails 323 to 346 displayed in the display area 300 and the size of the display area. More specifically, the control unit 101 obtains the maximum value and the minimum value of the latitude and the longitude from the position information pieces of the image files that the user focuses on. From these values, points having the maximum latitude and the maximum longitude and points having the minimum latitude and the minimum longitude are obtained. Then, a maximum scale value of the display area into which a rectangular area having these two points as diagonal points is fitted is determined. Further, a predetermined margin that corresponds to the determined scale is set for each of the points having the maximum latitude and the maximum latitude longitude and the points having the minimum latitude and the minimum latitude longitude. Lastly, a rectangular area having the two points with a margin as the diagonal points are determined as the display range. The predetermined margin is set so that an icon described below fits into the display area to make the icon easy to see.

In step S402, the control unit 101 reads out the map image of the determined display rang and scale from the recording medium 110 and displays it in the display area of the window.

In step S403, among the image files stored in the recording medium 110, the control unit 101 searches for an image file having the imaging position included in the determined display range. Wherein, for example, the control unit 101 performs as a second selection unit. Then, an icon indicating the existence of the searched image file is displayed in the display area. Subsequently, the control unit 101 determines whether the searched image file is included in the list. Then, according to the result of the determination, the icon is changed to a different icon.

More specifically, the icon that indicates the imaging position of the image file the user focuses on in the timeline display mode and the icon that indicates the imaging position of the image file the user did not focus on in the timeline display mode are displayed in a distinguishable manner. In other words, an icon indicating an imaging position of an image file having a thumbnail displayed in the display area 300 in the timeline display mode and an icon indicating an imaging position of an image file having a thumbnail not displayed in the display area 300 are displayed in a distinguishable manner.

For example, in FIG. 5, an icon indicating an imaging position of an image file the user focuses on in the timeline display mode is illustrated as an icon 501 and an icon indicting an imaging position of an image file the user did not focus on in the timeline display mode is illustrated as an icon 502. In FIG. 5, the numerical values 501 and 502 are assigned to only the representative icons.

If the mode is changed to the map display mode from the state in FIG. 3B, the image files of the thumbnails 323 to 346 are the images files the user is focusing on. Thus, the icons that indicate the imaging positions of these image files are displayed using the icon 501. On the other hand, in the state in FIG. 3B, the image files of the thumbnails 311 to 322 displayed in FIG. 3A are not the image files the user is focusing on. Thus, the icons that indicate the imaging positions of these image files are displayed using the icon 502 if the imaging positions are included in the display area. If the imaging positions are not included in the display area, the icons are not displayed.

Whether the image files are the focused image files in the timeline display mode can be determined by referencing the list of the focused image files. The processing in this step is executed in parallel with the processing in step S402. The icon is superimposed on the map image. In other words, if the processing in steps S402 and S403 is completed, the icon is superimposed on the map and displayed. Wherein, for example, the control unit 101 performs as a second display control unit.

In step S404, the control unit 101 receives an instruction from the user via the operation unit 105. The processing in this step is executed in parallel with the processing in steps S401 to S403.

A switch button 503 is displayed in the screen in FIG. 5 as is illustrated in the screen in FIG. 3. A user can input an instruction to change the mode to the timeline display mode by selecting the switch button 503 via the operation unit 105. Further, the user can input an instruction to change the scale of the map or an instruction to change the display range via the operation unit 105. For example, the user can input an instruction to change the scale of the map by rotating a mouse wheel. Further, the user can input an instruction to move the display range by performing drag and drop operation.

In steps S405 to S407, the control unit 101 determines the instruction received in step S404. In step S405, if the control unit 101 determines that the received instruction is an instruction to change the scale of the map (YES in step S405), the processing proceeds to step S408.

In step S408, the control unit 101 determines the appropriate display range from the designated scale and the size of the display area of the window. Then, the control unit 101 reads out map information of the designated scale and the determined display range from the recording medium 110, displays it in the display area of the window, and displays the icons corresponding to the image files of which imaging positions are included in the display range at the imaging positions on the map. In step S408, similar to the processing in step S403, the icon of the image file the user focuses on in the timeline display mode and the icon of the image file the user did not focus on in the timeline display mode are displayed in a distinguishable manner. When the processing in this step ends, the processing returns to step S404, and the control unit 101 waits for the next instruction.

In step S406, if the control unit 101 determines that the received instruction is an instruction to move the display range (YES in step S406), the processing proceeds to step S409.

In step S409, the control unit 101 reads out the map information that corresponds to the display range according to the instruction from the recording medium 110. Then, the control unit 101 displays the acquired map information in the display area of the window as well as displays the icons that correspond to the image files of which imaging positions are included in the display range. Similar to the processing performed in step S403, in step S409, the icons of the image files the user focuses on in the timeline display mode, and the icons of the image files the user did not focus on in the timeline display mode are displayed in a distinguishable manner. When the processing in step S409 ends, the processing returns to step S404, and the control unit 101 waits for the next instruction.

In step S407, if the control unit 101 determines that the received instruction is an instruction to change the mode to the timeline display mode (YES in step S407), the processing in this flowchart ends, and the mode is changed to the timeline display mode. Information about the display range in the timeline which is displayed just before the mode is changed from the timeline display mode to the map display mode is stored. Thus, when the mode is changed again to the timeline display mode, the display range displayed just before the mode has been changed to the map display mode will be displayed again.

The operation of the information processing apparatus in the map display mode is as described above.

As described above, the icons of the image files displayed in the timeline display mode and the icons of the image files not displayed in the timeline display mode are distinguishably displayed in the map display mode according to the information processing apparatus of the present exemplary embodiment. Thus, the user can easily recognize the imaging positions of the image files that the user focused on before the mode is changed.

Further, according to the information processing apparatus of the present exemplary embodiment, if the imaging positions of the image files which are not displayed in the timeline display mode are included in the display range, the icons indicating their imaging positions are displayed in the map display mode. Thus, the image files captured at the same location but at different date and time can be easily reproduced. In other words, a user can easily confirm the scenery and the streetscape that change with time and seasons at the same locations.

According to the above-described exemplary embodiment, when the thumbnails of the image files are displayed in a list, they are displayed based on the imaging date and time. However, the thumbnails can be displayed based on not only the imaging date and time but also various other indices, such as a name order, an update date, or of a file size. Further, the thumbnails can be displayed based on a plurality of indices. If the image files are uploaded to a different information processing apparatus and stored, the upload date and time can be stored for each image file. Then, such upload date and time can be used as the index. As described above, an appropriate display style can be used for finding the desired image file, so that a user can find the desired image file more easily.

Although image files are used as an example in the exemplary embodiment described above, similar processing can be applied to various types of content data such as a document file or a music file. For example, if the information processing apparatus handles document files, the information processing apparatus may have two modes (a first mode and a second mode). Display may change from the first mode in which images indicating contents of the documents are displayed in an order of file names to the second mode in which icons of the documents are displayed in an order of the generation date and time. In this case, the icons of the documents corresponding to the images displayed in the first mode and the icons of the documents corresponding to the images not displayed in the first mode are displayed in a distinguishable manner.

Further, according to the above-described exemplary embodiment, the timeline display and the map display are separately displayed. However, these two modes may be displayed on the screen at the same time. In this case, the update of the list of the focused image files in the timeline display mode and the display of the icons that indicate the imaging positions are performed in real time. In this manner, the images that the user focuses on can be easily recognized in both display modes.

Further, according to the above-described exemplary embodiment, the user can distinguish the imaging positions of the focused images and the imaging positions of other images by changing the color of the icons that indicate the imaging positions in the map display mode. However, in place of changing the color of the icons, for example, the size or the shape of the icons can be changed.

Further, according to the above-described exemplary embodiment, the imaging positions of the image files are displayed using an icon in the map display mode. However, a thumbnail of an image file may be displayed at the imaging position in place of an icon. In this case, for example, the color of a display frame or the display size of the thumbnail may be changed according to whether the thumbnail is of a focused image or not. Accordingly, the user can easily distinguish the focused image and other images. Thus, the content of the image file and the imaging position thereof can be recognized at the same time. Furthermore, although the thumbnails of the image files are displayed in the timeline display mode, they can also be displayed using the icons of the image files. If the icons of the image files are displayed, the load on the control unit 101 when the list is displayed can be reduced since the thumbnails are not necessarily read out.

In addition to the above-described exemplary embodiment, the information processing apparatus may be configured to change ON and OFF of the display to distinguish the focused images and other images.

Further, according to the above-described example of the timeline display, the thumbnails of the image files are displayed by the day. However, the thumbnails may be displayed by the week, the month, or the year.

Further, according to the example of the timeline display described above, the thumbnails are scrolled horizontally. However, the thumbnails can be scrolled vertically.

Further, according to the example of the timeline display described above, the thumbnails of the image files are scrolled in/out. However, in place of scrolling, all the thumbnails which are displayed can be replaced by what is referred to as a page switch.

In addition to the above-described exemplary embodiment, a plurality of image files can be managed in a hierarchical manner using the information management application. For example, a plurality of image files may be grouped into an album. In this case, for example, a user can select whether to display all the image files recorded in the recording medium 110 in the timeline display or to display only the image files included in the album selected by the user in the timeline display. Generally, the number of image files in an album is relatively smaller compared to the number of image files recorded in the recording medium. Thus, if the mode is changed from the timeline display mode to the map display mode in a case where only the image files included in an album are displayed, the user is not likely to lose sight of the focused image file. Thus, if only the image files included in an album are displayed in the timeline display, the IDs of the focused images may not be managed. In other words, in the case where only image files included in an album are displayed in the timeline display, if the mode is changed to the map display mode, a map having a display range and scale including the imaging positions of all the image files included in the album is displayed.

Aspects of the present disclosure can also be realized by a computer of a system or apparatus (or devices such as a CPU a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-010266 filed Jan. 20, 2012, which is hereby incorporated by reference herein in its entirety.

What is claimed is:

1. An information processing apparatus capable of displaying information about a plurality of content data pieces recorded in a recording medium in a display area of a display unit, the information processing apparatus comprising:
 a memory for storing data and a computer program; and
 a processor coupled to the memory for executing the computer program, the computer program comprising instructions for:
 receiving a user's operation; and
 controlling a display of the display area in a display mode selected from among a plurality of display modes according to the user's operation, the plurality of display modes including a timeline display mode and a map display mode;
 wherein the controlling executes the following steps:
 in a first display mode among the plurality of display modes, selecting content data from the plurality of content data pieces based on a first type attribute information of the content data, and controlling the display unit such that at least one image about the selected content data in the display area is in an arrangement sequentially based on the first type attribute information of the content data;
 in a second display mode among the plurality of display modes, selecting a content data from the plurality of content data pieces based on a second type attribute information different from the first type attribute information, and controlling the display unit such that information about the content data in the display area is in an arrangement based on the second type attribute information;
 wherein, based on an instruction received by the receiving for switching the mode from the first display mode to the second display mode, the display unit displays a first type icon indicating existence of the content data of which the at least one image is displayed in the first display mode and a second type icon indicating existence of content data of which at least one other image is not displayed in the first display mode on a same display area, a display format of the first type icon being different from a display format of the second type icon,
 wherein, based on an instruction received by the receiving in the first display mode for scrolling the at least one image, the display unit scrolls the at least one image in a direction according to the instruction in order of the sequential arrangement, and
 wherein, in a condition that at least a part of the at least one image is displayed in the display area even when a part of the at least one image is scrolled out of the display area by the scroll and is not displayed in the first mode, the at least one image is treated as being displayed in the first display mode upon switching to the second mode.

2. The information processing apparatus according to claim 1,
 wherein the first type attribute information includes date and time information, and
 wherein the controlling controls the display unit to display information about the content data in the display area in an arrangement based on the date and time information in the first display mode.

3. The information processing apparatus according to claim 1,
 wherein the second type attribute information includes position information, and
 wherein the controlling controls the display unit to display the icons in the display area in an arrangement based on the position information in the second display mode.

4. The information processing apparatus according to claim 3,
 wherein the same display area is a map display area, and the controlling controls the display unit to superimpose and display the icons on a map image in the map display area.

5. The information processing apparatus according to claim 4,
 wherein the controlling determines scale of the map image based on position information of the content data of which the at least one image is displayed in the first display mode in a case where the instruction which is for switching a mode from the first display mode to the second display mode is received by the receiving.

6. The information processing apparatus according to claim 4,
 wherein the controlling determines a display range of the map image based on the position information of the content data of which the at least one image is displayed in the first display mode in the case where the instruction which is for switching a mode from the first display mode to the second display mode is received by the receiving.

7. The information processing apparatus according to claim 6,
 wherein the controlling provides a predetermined margin with respect to the display range of the map image.

8. The information processing apparatus according to claim 1,
 wherein, based on an instruction received by the receiving for switching a mode from the second display mode to the first display mode is received by the receiving, the controlling displays information about the content data which is displayed when the instruction to control the display in the display area by the controlling is received by the receiving.

9. The information processing apparatus according to claim 1,
 wherein, based on an instruction received by the receiving from a user for grouping desired content data by selecting the data from among the plurality of content data pieces, the controlling groups a part of content data pieces of the plurality of content data pieces, and
 wherein, in a condition where only information about the content data which is grouped is displayed, a display format of icons to be displayed in the second mode is a same format.

10. The information processing apparatus according to claim 1,
 wherein the controlling further controls the display unit to display a scroll bar, and
 wherein, in a condition where the scroll bar is operated, the controlling selects content data different from the content data which is currently displayed.

11. A method for controlling an information processing apparatus capable of displaying information about a plurality of content data pieces recorded in a recording medium in a display area of a display unit, the method comprising:
 receiving a user's operation;
 controlling a display of a display area in a display mode selected from among a plurality of display modes according to the user's operation, the plurality of display modes including a timeline display mode and a map display mode;

wherein the controlling executes the following steps:

in a first display mode among the plurality of display modes, selecting content data from the plurality of content data pieces based on a first type attribute information of the content data, and controlling the display unit such that at least one image of the selected content data in the display area is in an arrangement sequentially based on the first type attribute information of the content data;

in a second display mode among the plurality of display modes, selecting content data from the plurality of content data pieces based on a second type attribute information different from the first type attribute information, and controlling the display unit such that information about the selected content data is in an arrangement based on the second type attribute information, and wherein, based on an instruction received by the receiving for switching the mode from the first display mode to the second display mode, the display unit displays a first type icon indicating existence of the content data of which the at least one image is displayed in the first display mode and a second type icon indicating existence of content data of which at least one other image is not displayed in the first display mode on a same display area, a display format of the first type icon being different from a display format of the second type icon, wherein, based on an instruction received by the receiving in the first display mode for scrolling the at least one image, the display unit scrolls the at least one image in a direction according to the instruction in order of the sequential arrangement, and wherein, in a condition that at least a part of the at least one image is displayed in the display area even when a part of the at least one image is scrolled out of the display area by the scroll and is not displayed in the first mode, the at least one image is treated as being displayed in the first display mode upon switching to the second mode.

12. A non-transitory computer readable recording medium which records a program for causing a computer to execute a method for controlling an information processing apparatus capable of displaying information about a plurality of content data pieces recorded in a recording medium in a display area of a display unit, the method comprising:

receiving a user's operation;

controlling a display of a display area in a display mode selected from among a plurality of display modes according to the user's operation, the plurality of display modes including a timeline display mode and a map display mode;

wherein the controlling executes the following steps:

in a first display mode among the plurality of display modes, selecting content data from the plurality of content data pieces based on a first type attribute information of the content data, and controlling the display unit such that at least one image about the selected content data in the display area is in an arrangement sequentially based on the first type attribute information of the content data;

in a second display mode among the plurality of display modes, selecting content data from the plurality of content data pieces based on a second type attribute information different from the first type attribute information, and controlling the display unit such that information about the selected content data is in an arrangement based on the second type attribute information, and wherein, based on an instruction received by the receiving for switching the mode from the first display mode to the second display mode, the display unit displays a first type icon indicating existence of the content data of which the at least one image is displayed in the first display mode and a second type icon indicating existence of content data of which at least one other image is not displayed in the first display mode on a same display area, a display format of the first type icon being different from a display format of the second type icon, wherein, based on an instruction received by the receiving in the first display mode for scrolling the image, the display unit scrolls the at least one image in a direction according to the instruction in order of the sequential arrangement, and wherein, in a condition that at least a part of the at least one image is displayed in the display area even when a part of the at least one image is scrolled out of the display area by the scroll and is not displayed in the first mode, the at least one image is treated as being displayed in the first display mode upon switching to the second mode.

* * * * *